Patented Feb. 14, 1933

1,897,286

UNITED STATES PATENT OFFICE

JAMES F. WALSH, OF EAST ORANGE, NEW JERSEY, ASSIGNOR TO CELLULOID CORPORATION, A CORPORATION OF NEW JERSEY

DENTAL PLATE BASE

No Drawing.    Application filed December 1, 1928.    Serial No. 323,204.

This invention relates to the preparation of dental plate bases, by the employment of cellulose nitrate as an ingredient of the composition of which they are made.

An object of my invention is to prepare dental plate bases that are relatively non-breakable, and which are capable of being colored so as to simulate the normal hue of healthy oral gums.

A further object of my invention is to prepare dental plate bases from pyroxylin compositions, which compositions are practically tasteless and odorless, and which do not tend to change in shape because of loss of volatile ingredients. Other objects of my invention will appear in the following detailed description.

The usual dental plate base consists of rubber that is colored in such a manner as to simulate the living hue of natural gums. In the preparation of the same, artificial teeth are set into the blank of the composition containing rubber and suitable sulphur compound by molding the same in a die of hardened plaster that is shaped to correspond with an impression of the mouth of the patient. After application of sufficient heat for vulcanization of the rubber, the molded plate, with its row of teeth, is removed from the die or mold in finished form. This form is permanent in shape since the rubber compound contains no volatile elements which will tend to evaporate and thus cause distortion. These plates do not tend to absorb and then exude liquids so as to produce objectionable and unhygienic effects. However, such rubber dental plates have the objectionable features of lack of strength and good coloration, since usual rubber plates are more or less breakable on shock, and have dull shades of color, which do not duplicate the delicate pink of healthy gums. This off-color is due to the difficulty of tinting rubber compounds which have a natural dull hue and is also due to the fading of the colors under the heat of molding and vulcanization.

I have found that if a dental plate base is made of a celluloid composition containing a derivative of cellulose and a non-volatile plastifier, such material may be readily worked, a hue may be imparted thereto that simulates the color of oral gums, the plate base does not warp, and it is substantially unbreakable under the hazards to which it is normally subjected.

In accordance with my invention, I prepare a celluloid or pyroxylin composition, by mixing cellulose nitrate, a volatile solvent or converting agent, a non-volatile plastifier and a pigment and/or dye. The mixture may then be worked in any desired manner to form dental plate bases.

The volatile solvent or converting agent that may be used may be any suitable one. However, it should not be poisonous or deleterious to health and therefore materials, such as methyl alcohol or benzol are preferably avoided. Generally, I prefer to employ ethyl alcohol as the volatile solvent.

The selection of the plastifier is of great importance. It should not only be relatively non-volatile, but should also be non-irritating, relatively odorless and tasteless, and should not have any properties that tend to impair the mucous membrane of the mouth. Generally, I have found that dibutyl phthalate or other phthalic acid esters are eminently suitable for this purpose. Camphor, which is the most commonly used plastifier for cellulose nitrate plastics, is unsuitable since because of its volatility, compositions containing the same tend to change in shape because of the escape of the camphor. The use of camphor in dental plates renders a perfect fit to the mouth almost impossible.

The pigment and/or dye employed is preferably such a combination as will impart to the plastic mass the color of healthy gums. These materials should not be harmful to human beings. The pigment used for the white base of each tint, is preferably zinc oxide.

In one form of carrying out my invention, 100 parts of cellulose nitrate, 50 parts of dibutyl phthalate, and 50 to 70 parts of ethyl alcohol, together with sufficient pigments and dyes to impart the color of healthy gums, are kneaded together at elevated temperature, to form a converted mass of celluloid material.

On account of the delicacy of the operations required for making dental bases, I prefer to employ a liberal amount of ethyl alcohol, since I consider the loss of excessive alcohol preferable to the risk of loss of color or strength in the final products. While the use of more than 50 parts of plastifier will produce a product that may more readily be molded, it is recommended that much more than this amount of plastifier be not used, since, if appreciably more is used, the resulting product will not have sufficient rigidity and strength.

The plastic mass thus formed, is then solidified by evaporation of excessive solvents. While I prefer to solidify the same in the form of sheets, it may be solidified in other forms; thus the plastic mass may be extruded in the form of circular or oval shaped rods by running it through a stuffing machine having appropriate nozzles. The solidified articles are then thoroughly seasoned in order to eliminate the alcohol, and leave behind a solid product which will hold its form after shaping. The seasoned sheets or rods are then cut into the desired size. If oval rods are employed, a slice of the same may be used for forming the plates.

The seasoned sheets, slices or small pieces of celluloid are then molded under heat or pressure in the usual dental flask to form the dental plate base or denture. The dental plate base thus formed has the color of healthy gums, is comparatively non-breakable, does not warp or otherwise alter its shape because of the loss of volatile solvents, and is practically free of odor.

It is to be understood that the foregoing detailed description is given merely in the way of illustration and that many variations may be made therein, without departing from the spirit of my invention.

Having described my invention, what I claim and desire to secure by Letters Patent, is:

1. A dental plate base containing cellulose nitrate and dibutyl phthalate.

2. A dental plate base containing cellulose nitrate, dibutyl phthalate and residual ethyl alcohol.

In testimony whereof, I have hereunto subscribed my name.

JAMES F. WALSH.